US008897487B1

(12) United States Patent
Ioffe

(10) Patent No.: US 8,897,487 B1
(45) Date of Patent: *Nov. 25, 2014

(54) SYSTEMS AND METHODS FOR FACILITATING COMBINED MULTIPLE FINGERPRINTERS FOR MEDIA

(71) Applicant: Google Inc., Mountain View, CA (US)

(72) Inventor: Sergey Ioffe, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/262,238

(22) Filed: Apr. 25, 2014

Related U.S. Application Data

(63) Continuation of application No. 13/457,460, filed on Apr. 26, 2012, now Pat. No. 8,750,562.

(51) Int. Cl.
*G06K 9/00* (2006.01)
*G06T 1/00* (2006.01)
*G06F 17/00* (2006.01)

(52) U.S. Cl.
CPC ....... *G06T 1/0021* (2013.01); *G06T 2201/0064* (2013.01)
USPC ............................ 382/100; 382/243; 707/698

(58) Field of Classification Search
USPC ......... 382/100, 103, 106–107, 124, 155, 162, 382/168, 173, 181, 209–220, 232, 254, 274, 382/276, 286–295, 305, 312, 243; 704/270; 707/698, 723
See application file for complete search history.

(56) References Cited

U.S. PATENT DOCUMENTS

| | | | |
|---|---|---|---|
| 7,577,272 B2 * | 8/2009 | Harmanci et al. | 382/100 |
| 7,711,564 B2 * | 5/2010 | Levy et al. | 704/270 |
| 8,494,234 B1 * | 7/2013 | Bozinovic et al. | 382/124 |
| 8,542,869 B2 * | 9/2013 | He et al. | 382/100 |
| 2010/0318515 A1 * | 12/2010 | Ramanathan et al. | 707/723 |

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

(Continued)

*Primary Examiner* — Seyed Azarian
(74) *Attorney, Agent, or Firm* — Amin, Turocy & Watson, LLP

(57) ABSTRACT

Systems and methods for facilitating combining media fingerprinters are provided. In one implementation, a system can include a memory and a microprocessor. The system can also include: a communication component that receives media; a wavelet-based hash generation component that generates a plurality of hashes based on wavelet descriptors associated with the media; a local features information generation component that generates local descriptors associated with the media; a grouping component that groups the plurality of hashes into two or more subgroups, and generates a combined group of descriptors. The combined group of descriptors can include quantized local descriptors and groups of hashes. The system can also include a hash generation component that hashes the combined group of descriptors.

13 Claims, 7 Drawing Sheets

(56) References Cited

OTHER PUBLICATIONS

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

"Altnet Launches Global File Registry," P2P File Sharing, http://www.p2p-weblog.com/50226711/altnet_launches_global_file_registry.php, Last accessed Jul. 16, 2012.

Notice of Allowance for U.S. Appl. No. 13/457,460, dated Jan. 21, 2014, 26 pages.

\* cited by examiner

SYSTEMS AND METHODS FOR FACILITATING COMBINED MULTIPLE FINGERPRINTERS FOR MEDIA

CROSS-REFERENCE TO RELATED APPLICATIONS

This application is a continuation of U.S. patent application Ser. No. 13/457,460, filed Apr. 26, 2012, and entitled, "SYSTEMS AND METHODS FOR FACILITATING COMBINED MULTIPLE FINGERPRINTERS FOR MEDIA," the entirety of which is incorporated herein by reference.

TECHNICAL FIELD

This disclosure generally relates to media fingerprinting.

BACKGROUND

Conventional video processing methods employ media fingerprinting to identify near-duplicates of media, and/or portions thereof. Media fingerprinting can be also employed in identifying copyrighted material in media. Different types of fingerprinting approaches can be useful. However, different types of fingerprints have different characteristics and differing forms of dependence on the similarity or degree of near-duplicateness between media. As such, systems and methods that provide new approaches for facilitating different types of fingerprinting approaches for media are desired.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its purpose is to present some concepts of one or more implementations in a simplified form as a prelude to the more detailed description that is presented later.

In one or more implementations, the disclosed subject matter relates to a system that performs media fingerprinting, comprising: a memory that stores computer executable components; and a microprocessor that executes computer executable components stored in the memory. The computer executable components can include: a communication component that receives a portion of media; and a media fingerprinting component that fingerprints the portion of media. The media fingerprinting component can employ a fingerprint generation component stored in the memory and including: a wavelet-based hash generation component that generates one or more wavelet-based hashes based, at least, on one or more wavelets associated with the portion of media; a local descriptors component that generates a weighted set of descriptors associated with the portion of media; a first hashing component that computes one or more hashes from the one or more wavelet-based hashes; a grouping component that groups at least one of the one or more wavelet-based hashes into one or more groups of wavelet-based hashes; a combining component that combines the one or more groups of wavelet-based hashes with the weighted set of descriptors, wherein the one or more groups of wavelet-based hashes includes a weighted set of the one or more groups of wavelet-based hashes; and a second hashing component that generates a final hash based, at least, on hashing the combined one or more groups of the wavelet-based hashes with the weighted set of descriptors.

In one or more implementations, the disclosed subject matter relates to a method facilitating media fingerprinting. The method can include: receiving a portion of media; generating one or more wavelet-based hashes based, at least, on one or more wavelets associated with the portion of media; generating a weighted set of descriptors associated with the portion of media; computing one or more hashes from the one or more wavelet-based hashes; grouping one or more of the one or more wavelet-based hashes into one or more groups of wavelet-based hashes; combining the one or more groups of wavelet-based hashes with the weighted set of descriptors, wherein the one or more groups of wavelet-based hashes includes a weighted set of the one or more groups of wavelet-based hashes; and generating a final hash based, at least, on hashing the combined one or more groups of the wavelet-based hashes with the weighted set of descriptors.

In one or more implementations, the disclosed subject matter relates to a method facilitating media fingerprinting. The method can include: generating a plurality of hashes based, at least, on a plurality of wavelet descriptors associated with media; generating a plurality of local descriptors associated with the media; grouping the plurality of hashes into two or more subgroups; generating a combined group of descriptors, the combined group of descriptors including quantized ones of the plurality of local descriptors and groups of the plurality of hashes; and hashing the combined group of descriptors.

In one or more implementations, the disclosed subject matter relates to a system that performs media fingerprinting, including: a memory that stores computer executable components; and a microprocessor that executes computer executable components stored in the memory. The computer executable components can include: a wavelet-based hash generation component that generates a plurality of hashes based, at least, on a plurality of wavelet descriptors associated with media; a local features information generation component that generates a plurality of local descriptors associated with the media. The computer executable components can also include a grouping component that: groups the plurality of hashes into two or more subgroups; and generates a combined group of descriptors, the combined group of descriptors including quantized ones of the plurality of local descriptors and groups of the plurality of hashes. The computer executable component can also include a hash generation component that hashes the combined group of descriptors.

In one or more implementations, the disclosed subject matter relates to another system that performs media fingerprinting, including: a memory that stores computer executable components; and a microprocessor that executes computer executable components stored in the memory. The computer executable components can include: a communication component that receives a portion of media; and media fingerprinting component that fingerprints the portion of media, the media fingerprinting component employing a fingerprint generation component stored in the memory. The computer executable components can include: a plurality of descriptor sources that generate at least first information and second information associated with the portion of the media; and a first hashing component that computes: a first set of one or more hashes from the first information; and a second set of one or more hashes from the second information. The computer executable components can also include: a combining component that combines the first set of the one or more hashes and the second set of the one or more hashes; and a second hashing component that generates a final hash based, at least, on hashing the combined first set of the one or more hashes with the second set of the one or more hashes.

In one or more implementations, the disclosed subject matter relates to another system that performs media fingerprinting, including: a memory that stores computer executable components; and a microprocessor that executes computer executable components stored in the memory. The computer executable components can include: a communication component that receives a portion of media; and a media fingerprinting component that fingerprints the portion of media, the media fingerprinting component employing a fingerprint generation component stored in the memory. The computer executable components can include: a plurality of descriptor sources that generate at least first information and second information associated with the portion of the media; a first hashing component that computes a first set of one or more hashes from the first information; a combining component that combines the first set of the one or more hashes and the second information; and a second hashing component that generates a final hash based, at least, on hashing the combined first set of the one or more hashes with the second information.

Toward the accomplishment of the foregoing and related ends, the one or more implementations include the features hereinafter fully described and particularly pointed out in the claims. The following description and the annexed drawings set forth herein detail certain illustrative aspects of the one or more implementations. These aspects are indicative, however, of but a few of the various ways in which the principles of various implementations can be employed, and the described implementations are intended to include all such aspects and their equivalents.

DETAILED DESCRIPTION

Figure 1:
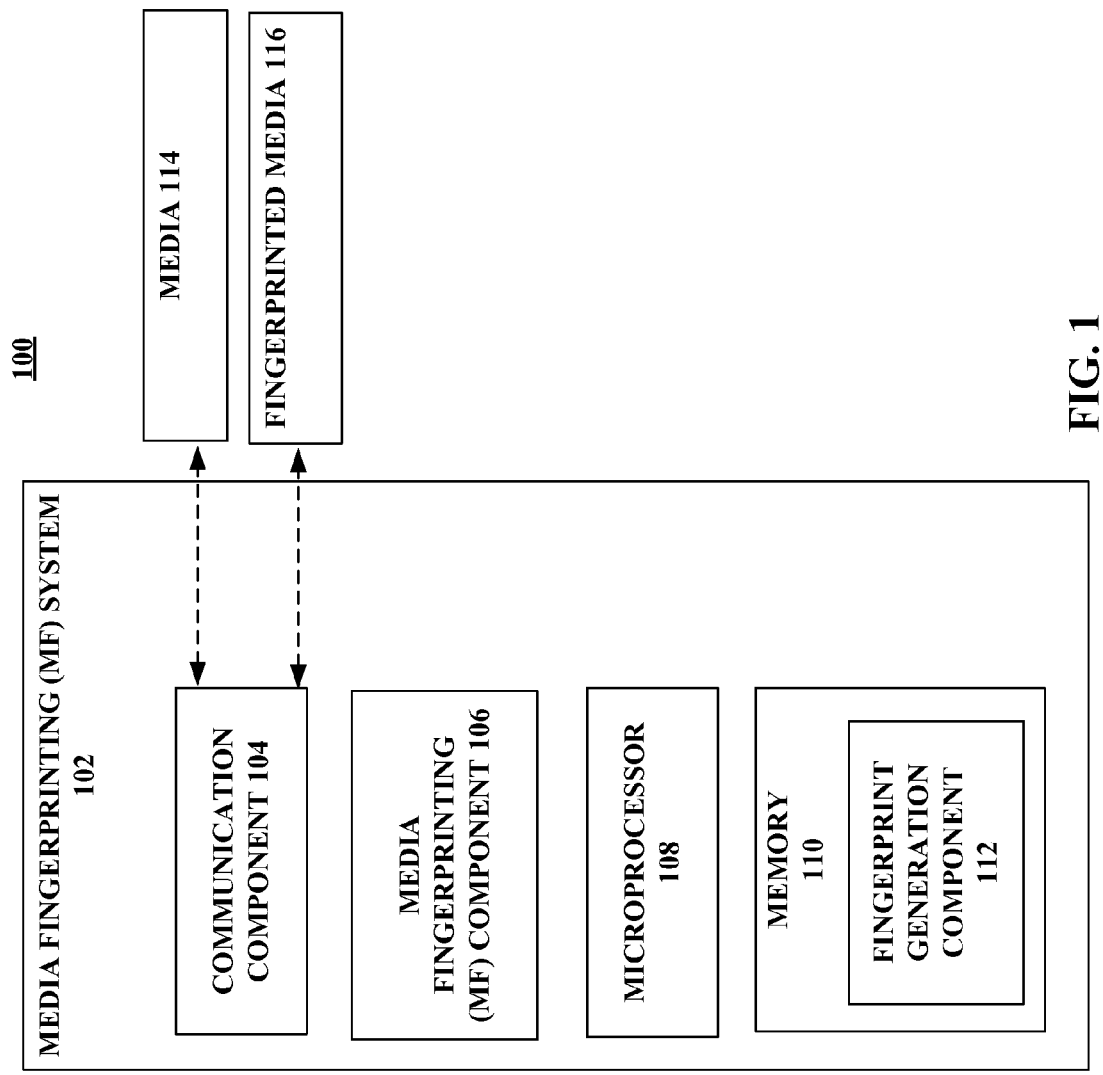
FIG. 1 is an illustration of a block diagram of an exemplary non-limiting system that facilitates combining multiple fingerprinters for media in accordance with this disclosure.

Various implementations are now described with reference to the drawings, wherein like reference numerals are used to refer to like elements throughout. In the following description, for purposes of explanation, numerous specific details are set forth in order to provide a more thorough understanding of one or more implementations. It is evident, however, that such implementations can be practiced without these specific details. In other instances, structures and devices are shown in block diagram form in order to facilitate describing one or more implementations.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Media fingerprinting can be used to identify near-duplicates of media, and/or portions thereof, and to identify copyrighted material in media. Different types of fingerprinting approaches can be useful. For example, different types of fingerprinting can be employed to address crops, scaling and/or flipped versions of the media. Different types of fingerprints have different characteristics and differing forms of dependence on the similarity or degree of near-duplicateness between media. Systems and methods that provide new approaches for facilitating different types of fingerprinting approaches for media are desired.

Systems and methods disclosed herein relate to media fingerprinting using a combination of local descriptors and wavelet-based hashes. In particular, a system can include: a communication component that receives a portion of media, and media fingerprinting component that fingerprints the portion of media. The media fingerprinting component can employ a fingerprint generation component stored in the memory. The fingerprinting component can include a wavelet-based hash generation component that generates one or more wavelet-based hashes. The one or more wavelet-based hashes can be based, at least, on one or more wavelets associated with the portion of media. The media fingerprinting component can also include a local descriptors component that generates a weighted set of descriptors associated with the portion of media. The media fingerprinting component can also include a first hashing component that computes one or more hashes from the one or more wavelet-based hashes, and a grouping component that groups at least one of the one or more wavelet-based hashes into one or more groups of wavelet-based hashes. The media fingerprinting component can also include a combining component that combines the groups of wavelet-based hashes with the weighted set of descriptors. The groups of wavelet-based hashes can include a weighted set of the groups of wavelet-based hashes. The media fingerprinting component can also include a second hashing component that generates a final hash based, at least, on hashing the combined one or more groups of the wavelet-based hashes with the weighted set of descriptors.

The systems and methods can advantageously facilitate the combination of local descriptors and wavelet-based hashes in media fingerprinting to take advantage of the matching for various levels of similarity with each type of information. For example, local descriptors and wavelet-based hashes have very different characteristics, and the different sources of fingerprints can have different forms of dependence on the similarity (or degree of near-duplicateness) between videos. For instance, the representation of videos as weighted bags of quantized local descriptors can result in relatively few resulting hashes matching. However, wavelet-based fingerprints for example, can have similarity that is considerably higher. The two representations have different strengths and weaknesses: local descriptors are both descriptive and to a large degree invariant to transforms such as crops and scaling, while the wavelets can be more reliably detected. Even when different weights are assigned to different types of descriptors, we run into the problem of thresholds: the threshold for local descriptor similarity and that for wavelets can be very different, while the retrieval system benefits from just having one threshold. Systems and methods described herein can advantageously facilitate the combination of local descriptors and wavelet-based hashes in media fingerprinting to take advantage of the matching for various levels of similarity with each type of information.

In various implementations, systems and methods described herein can also include any number of different types of descriptor sources that can be combined. While various implementations disclosed describe wavelet-based hashes and local descriptors, in other implementations, other types of descriptors can be employed. In one implementation, for given sources of features for fingerprinting, a fingerprinting system normalizes both the number of features per fingerprinter and the thresholds each type of fingerprinter uses for matching. For example, when the number of local descriptors is up to 25 and the threshold is 5, one implementation achieves a similar number of features, with similar thresholds, for wavelets descriptors, even though the initial number of wavelet descriptors may be much higher, and the corresponding threshold may be also relatively higher. One implementation uses hashing with banding to perform both normalizations. For example, one implementation computes a certain number of hashes for one or more of the sources to generate a fixed number of hashes, and then groups these hashes into groups of one or more hashes to adjust the threshold used for matching. For example, employing pairs of hashes per group can change the matching probability from p to p^2, which can make a graph mapping similarity to hash collisions steeper, emphasizing higher probabilities (i.e. higher similarities) and deemphasizing smaller probabilities (which will be relatively flat on the mapping).

In some implementations, a system can include: a communication component that receives a portion of media; and media fingerprinting component that fingerprints the portion of media, the media fingerprinting component employing a fingerprint generation component stored in the memory. The computer executable components can include: a plurality of descriptor sources that generate at least first information and second information associated with the portion of the media; and a first hashing component that computes: a first set of one or more hashes from the first information; and a second set of one or more hashes from the second information. The computer executable components can also include: a combining component that combines the first set of the one or more hashes and the second set of the one or more hashes; and a second hashing component that generates a final hash based, at least, on hashing the combined first set of the one or more hashes with the second set of the one or more hashes. In some implementations, the first information and/or the second information can be wavelet-based hashes, local descriptors and/or any of a number of other different types of hashes and/or descriptors that are associated with the media.

Additionally, in various implementations, sets of information from different sources can be hashed and combined or, in some implementations, one set of information can be hashed and combined with a second set of information that is not hashed. All such implementations are envisaged and contemplated.

FIG. 1 is an illustration of a block diagram of an exemplary non-limiting system that facilitates media fingerprinting. The media fingerprint can include a combination of local descriptors and wavelet-based hashes. In various implementations, the media can include video or one or more images.

The media fingerprinting system (e.g., MF system 100) can include media fingerprinting (MF) system 102 that can include a communication component 104, media fingerprinting (MF) component 106, a microprocessor 108 and/or a memory 110. In some implementations, MF system 100 can also include media 114 and/or fingerprinted media 116. The communication component 104, MF component 106, microprocessor 108 and/or memory 110 can be electrically and/or communicatively coupled to one another to perform one or more functions of the system 100 described in this disclosure.

The communication component 104 can receive media 114, or a portion thereof. The communication component 104 can also output fingerprinted media 116, as shown in FIG. 1. The fingerprinted media 116 can include a fingerprint. In various implementations, the fingerprint can be a combination of wavelet-based hashes and/or local descriptors.

In some implementations, the communication component 104 can also output a fingerprint for the received media 114. In various implementations, the communication component 104 can access media stored at the memory 110 of the MF system 102 and/or stored at a location remote from the MF system 102. For example, the communication component 104 can access the media 114 over a network (not shown) including, but not limited to, the internet.

The MF component 106 can fingerprint the media with the fingerprint. In various implementations, for example, the MF component 106 can employ the fingerprint generation component 112 stored in the memory 110 to generate the fingerprint with which the media (or a portion thereof) is fingerprinted.

Microprocessor 108 can perform one or more of the functions described in this disclosure with reference to any of the systems and/or methods disclosed.

The memory 110 can be a computer-readable storage medium storing computer-executable instructions and/or information for performing the functions described in this disclosure with reference to any of the systems and/or methods disclosed. For example, as shown, memory 110 can store computer-executable instructions in some implementations, for performing the functions of the fingerprint generation component 112.

Figure 2:
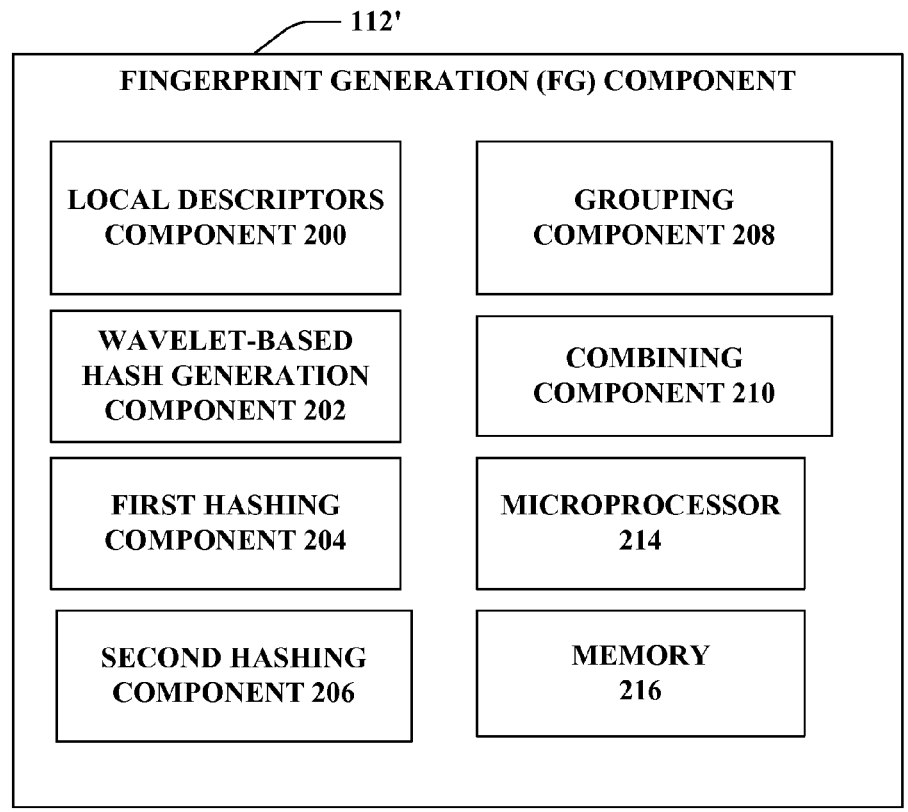
FIG. 2 is an illustration of a block diagram of an exemplary non-limiting system that facilitates combining multiple fingerprinters for media in accordance with this disclosure.

FIG. 2 is an illustration of a block diagram of an exemplary non-limiting fingerprint generation component (FG 112') that can facilitate media fingerprinting using a combination of local descriptors and wavelet-based hashes. One or more of the structure and/or functions of the FG component 112 of FIG. 1 can be as described and/or shown with reference to the FG component 112' of FIG. 2.

As shown in FIG. 2, the FG component 112' can include a local descriptors component 200, a wavelet-based hash generation component 202, a first hashing component 204, a second hashing component 206, a grouping component 208, a combining component 210, a microprocessor 214 and/or a memory 216. In some embodiments, microprocessor 214 can be or be included as part of microprocessor 108. Similarly, in some embodiments, memory 216 can be or be included as part of memory 110. In various implementations, one or more of the local descriptors component 200, wavelet-based hash generation component 202, first hashing component 204, second hashing component 206, grouping component 208, combining component 210, microprocessor 214 and/or memory 216 can be electrically and/or communicatively coupled to perform one or more functions of the FG component 112' (or FG component 112).

The local descriptors component 200 can generate a weighted set of descriptors associated with the media or a portion thereof. In various implementations, the weighted set of descriptors can include a weighted set of one or more local descriptors, a weighted set of one or more quantized local descriptors and/or a weighted set of visual words indicative of a content of the media (or portion thereof).

In some implementations, the local descriptors component 200 can determine one or more local descriptors for one or more frames of media. In various implementations, the local descriptors can be determined for an average of two or more frames. The frames can be selected (or averages of the frames can be determined) prior to generating the local descriptors. As such, the frames (or averages thereof) can be separated by one or more other frames, or be of various durations of time, in some implementations.

The local descriptors for one or more frames (or averages of two or more frames) can be based on the content of the one or more frames (or the averages of the two or more frames). The local descriptors can include, but are not limited to, information indicative of a type, position, scale or aspect ratio of the frame (or average of two or more frames). In various implementations, the local descriptor can include information indicative of a descriptor of a portion of the frame (or average of two or more frames). In some implementations, the local descriptor can include a scale invariant feature transform (SIFT) descriptor, a Speeded Up Robust Feature (SURF) descriptor, a CONGAS descriptor, or another variant of descriptor. SIFT is an algorithm in computer vision to detect and describe local features in images. SURF is an image detector and descriptor that can be used for computer vision tasks like object recognition. CONGAS is a local descriptor based on Gabor wavelets of varying scale and orientation drawn from a space variant grid around an interest point.

The wavelet-based hash generation component 202 can generate one or more wavelet-based hashes for the portion of the media. The wavelet-based hashes can be indicative of a content of the portion of the media. In various implementations, the wavelet-based hashes can be based, at least, on one or more wavelets associated with the portion of media. In some implementations, the wavelets can be overcomplete wavelets.

The first hashing component 204 can compute one or more hashes from the one or more wavelet-based hashes. By way of example, but not limitation, the first hashing component 204 can receive the one or more wavelet-based hashes generated based on the media. The first hashing component 204 can then hash the one or more wavelet-based hashes.

In some implementations, quantization of the local descriptors can be employed to facilitate removal or foregoing selection of one or more of the local descriptors originally generated based on the media (or portion thereof). As such, the first hashing component 204 can combine a selected set of the quantized weighted local descriptors with the wavelet-based hashes.

The grouping component 208 can group two or more of the wavelet-based hashes. Accordingly, the grouping component 208 can generate one or more groups of wavelet-based hashes. The one or more groups can each include one or more wavelet-based hashes.

The combining component 210 can combine the groups of wavelet-based hashes with the weighted set of local descriptors. In various implementations, the combining component 210 can combine the groups by concatenating the wavelet-based hashes and the weighted set of local descriptors, for example. In other implementations, any of a number of different ways of combining wavelet-based hashes and a weighted set of local descriptors can be employed. Further, while the implementations described herein refer to a weighted set of local descriptors, in some implementations, a set of weighted quantized local descriptors can be employed.

In various implementations, in order to have a similar number of local descriptors as wavelet-based hashes, and to obtain a similar threshold for matching with the wavelets and the local descriptors, grouping can be performed as a way to perform normalization between the wavelet-based hashes and the local descriptors.

In some implementations, a certain number of wavelet-based hashes can be computed for the media. The hashes can be computed based on a Weighted MinHash algorithm in some implementations, when the input distance is defined to be L1 or Jaccard. Minhash (min-wise independent permutations locality sensitive hashing) is a technique for quickly estimating the similarity between two sets. One weighted minhash that can be employed, Weighted Minhash, generalizes the min-wise permutation hashes of Broder (see e.g., Broder et al., "Min-wise independent permutations," J. Comput. Syst. Sci., vol. 60, no. 3, pp. 630-659, 2000) from binary to real weights. (See Sergey Ioffe, "Improved Consistent Sampling, Weighted Minhash and L1 Sketching," IEEE ICDM, 2010.)

The hashes can be grouped into groups (or blocks) of one or more hashes. Employing pairs of hashes per group can change the collision probability p (e.g., matching probability) between media.

In one implementation, the wavelet-based hashes can be grouped into 25 groups of three hashes per group. The groups can be concatenated (or otherwise combined) with up to 25 local descriptors (or, in some implementations, up to 25 quantized local descriptors), yielding a total of between 25 and 50 descriptors total (e.g., 25 local descriptors and 25 wavelet-based hashes). The resulting concatenated vector can then be hashed to generate a final hash using Weighted MinHash. In some implementations, the second hashing component 206 can generate the final hash.

Figure 3A:
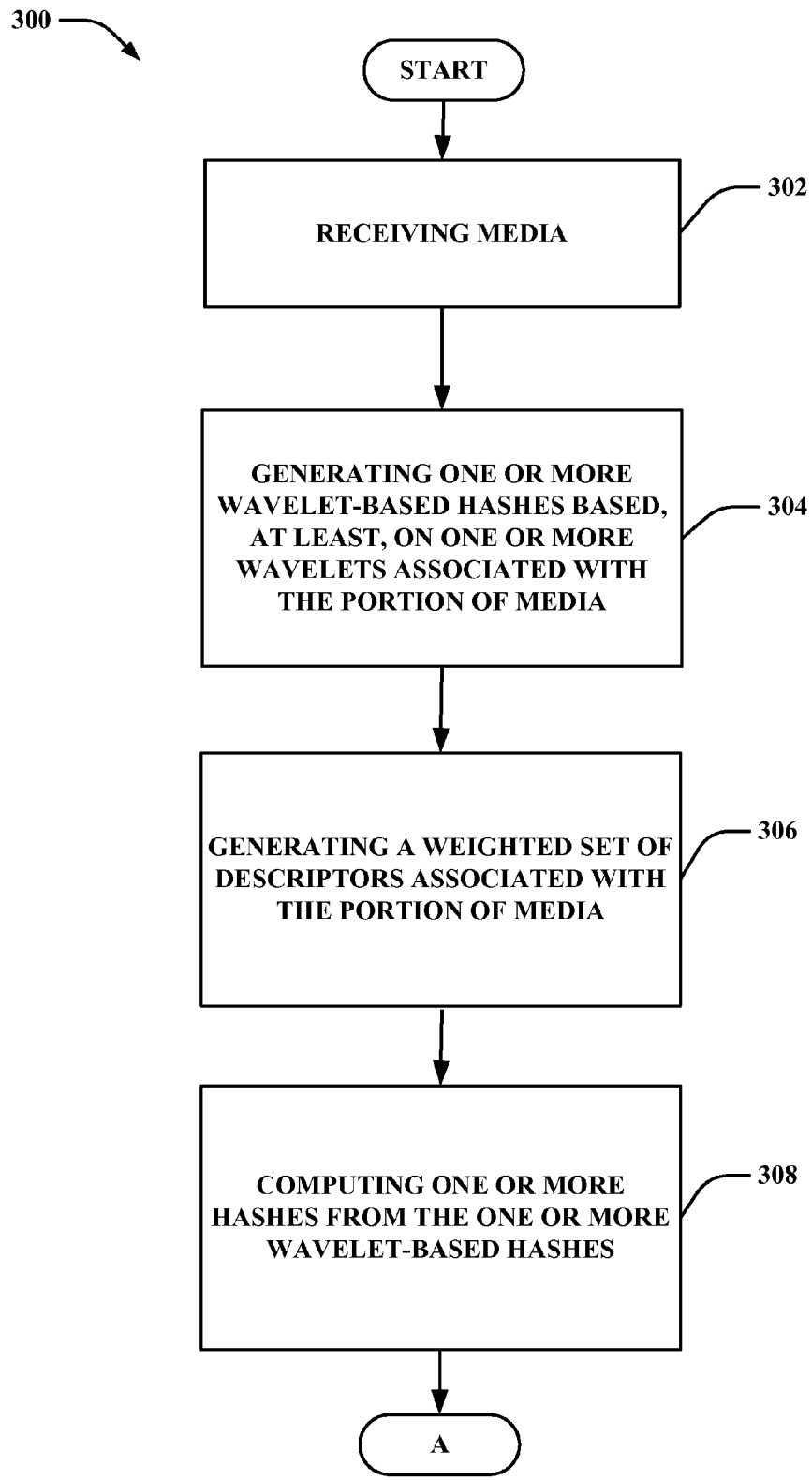
FIGS. 3A, 3B and 4 are illustrations of exemplary flow diagrams of methods that facilitate combining multiple fingerprinters for media in accordance with this disclosure.
Figure 3B:
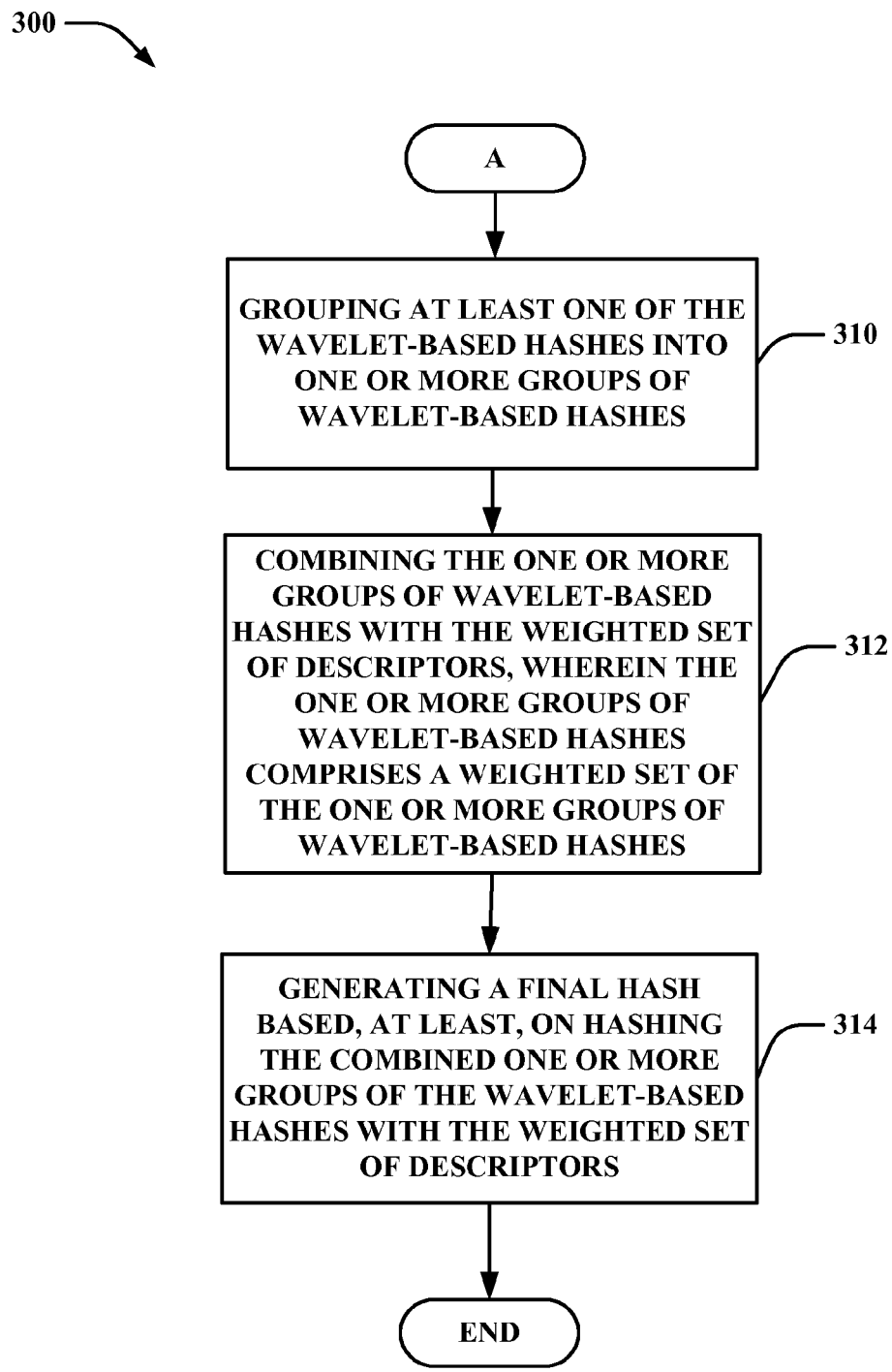
Figure 4:
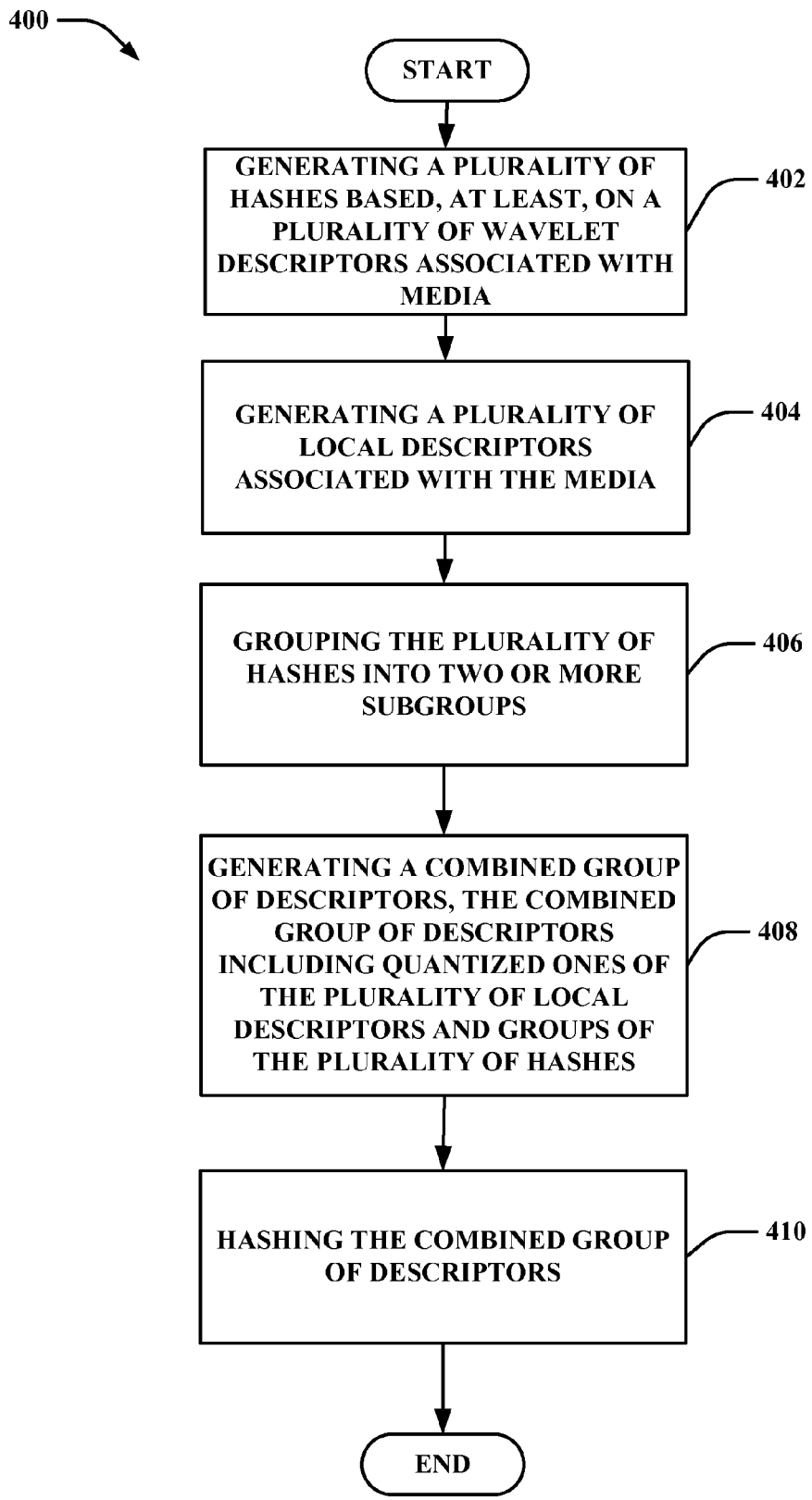

FIGS. 3A, 3B and 4 are illustrations of exemplary flow diagrams of methods that facilitate combining multiple fingerprinters for media in accordance with this disclosure.

Turning first to FIGS. 3A and 3B, at 302, method 300 can include receiving media (e.g., using the communication component 104). At 304, method 300 can include generating one or more wavelet-based hashes based, at least, on one or more wavelets associated with the portion of media (e.g., using the wavelet-based hash generation component 202).

At 306, method 300 can include generating a weighted set of descriptors associated with the portion of media (e.g., using the local descriptors component 200).

At 308, method 300 can include computing one or more hashes from the one or more wavelet-based hashes (e.g., using the first hashing component 204).

Turning to FIG. 3B, at 310, method 300 can include grouping at least one of the one or more wavelet-based hashes into one or more groups of wavelet-based hashes (e.g., using the grouping component 208).

At 312, method 300 can include combining the one or more groups of wavelet-based hashes with the weighted set of descriptors (e.g., using the combining component 210). In some implementations, the one or more groups of wavelet-based hashes can include a weighted set of the one or more groups of wavelet-based hashes.

At 314, method 300 can include generating a final hash based, at least, on hashing the combined one or more groups of the wavelet-based hashes with the weighted set of descriptors (e.g., using the second hashing component 206).

Turning now to FIG. 4, at 402, method 400 can include generating a plurality of hashes based, at least, on a plurality of wavelet descriptors associated with media (e.g., using the wavelet-based hash generation component 202).

At 404, method 400 can include generating a plurality of local descriptors associated with the media (e.g., using the local descriptors component 200).

At 406, method 400 can include grouping the plurality of hashes into two or more subgroups (e.g., using the grouping component 208).

At 408, method 400 can include generating a combined group of descriptors, the combined group of descriptors including quantized ones of the plurality of local descriptors and groups of the plurality of hashes (e.g., using the combining component 210).

At 410, method 400 can include hashing the combined group of descriptors (e.g., using the second hashing component 206 and applying Weighted MinHash).

Exemplary Networked and Distributed Environments

One of ordinary skill in the art can appreciate that the various implementations described in this disclosure can be implemented in connection with any computer or other client or server device, which can be deployed as part of a computer network or in a distributed computing environment, and can be connected to any kind of data store where media may be found. In this regard, the various implementations described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various implementations of this disclosure.

Figure 5:
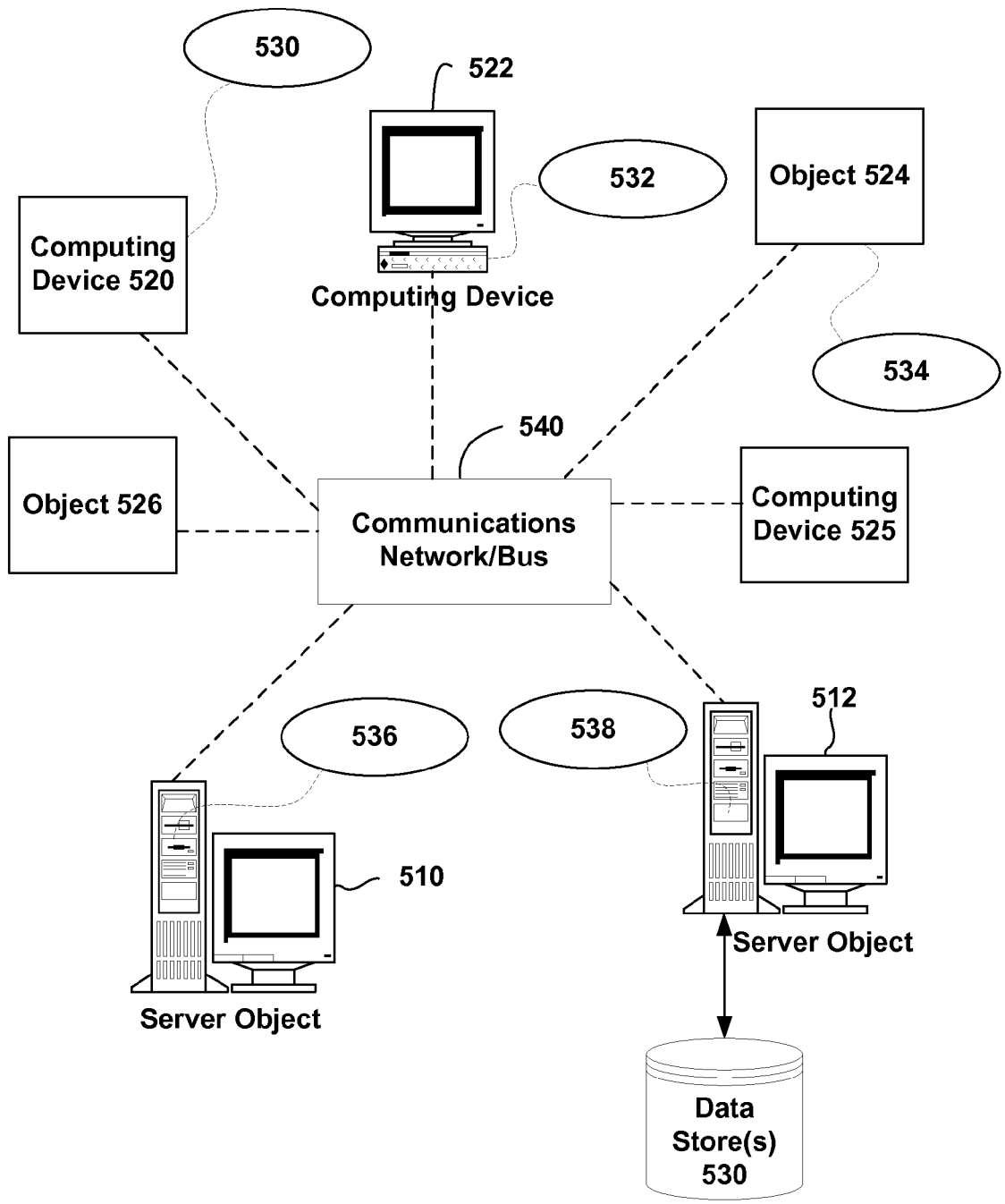
FIG. 5 is an illustration of a schematic diagram of an exemplary networked or distributed computing environment for implementing one or more implementations described in this disclosure.

FIG. 5 provides a schematic diagram of an exemplary networked or distributed computing environment in which implementations described in this disclosure can be implemented. The distributed computing environment includes computing objects 510, 512, etc. and computing objects or devices 520, 522, 524, 526, 528, etc., which can include programs, methods, data stores, programmable logic, etc., as represented by applications 530, 532, 534, 536, 538. It can be appreciated that computing objects 510, 512, etc. and computing objects or devices 520, 522, 524, 526, 528, etc. can include different devices, such as personal digital assistants (PDAs), audio/video devices, mobile phones, MPEG-1 Audio Layer 3 (MP3) players, personal computers, laptops, tablets, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, network 540 can include other computing objects and computing devices that provide services to the system of FIG. 5, and/or can represent multiple interconnected networks, which are not shown. Each computing object 510, 512, etc. or computing objects or devices 520, 522, 524, 526, 528, etc. can also contain an application, such as applications 530, 532, 534, 536, 538, that might make use of an application programming interface (API), or other object, software, firmware and/or hardware, suitable for communication with or implementation of the various implementations of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various implementations.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc. provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances. Any of these computing devices can process data, or request transaction services or tasks that can implicate the techniques for systems as described in this disclosure for one or more implementations.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described in this disclosure can be provided standalone, or distributed across multiple computing devices or objects.

In a network environment in which the communications network/bus 540 can be the Internet, for example, the computing objects 510, 512, etc. can be Web servers, file servers, media servers, etc. with which the client computing objects or devices 520, 522, 524, 526, 528, etc. communicate via any of a number of known protocols, such as the hypertext transfer protocol (HTTP). Objects 510, 512, etc. can also serve as client computing objects or devices 520, 522, 524, 526, 528, etc., as can be characteristic of a distributed computing environment.

Exemplary Computing Device

Figure 6:
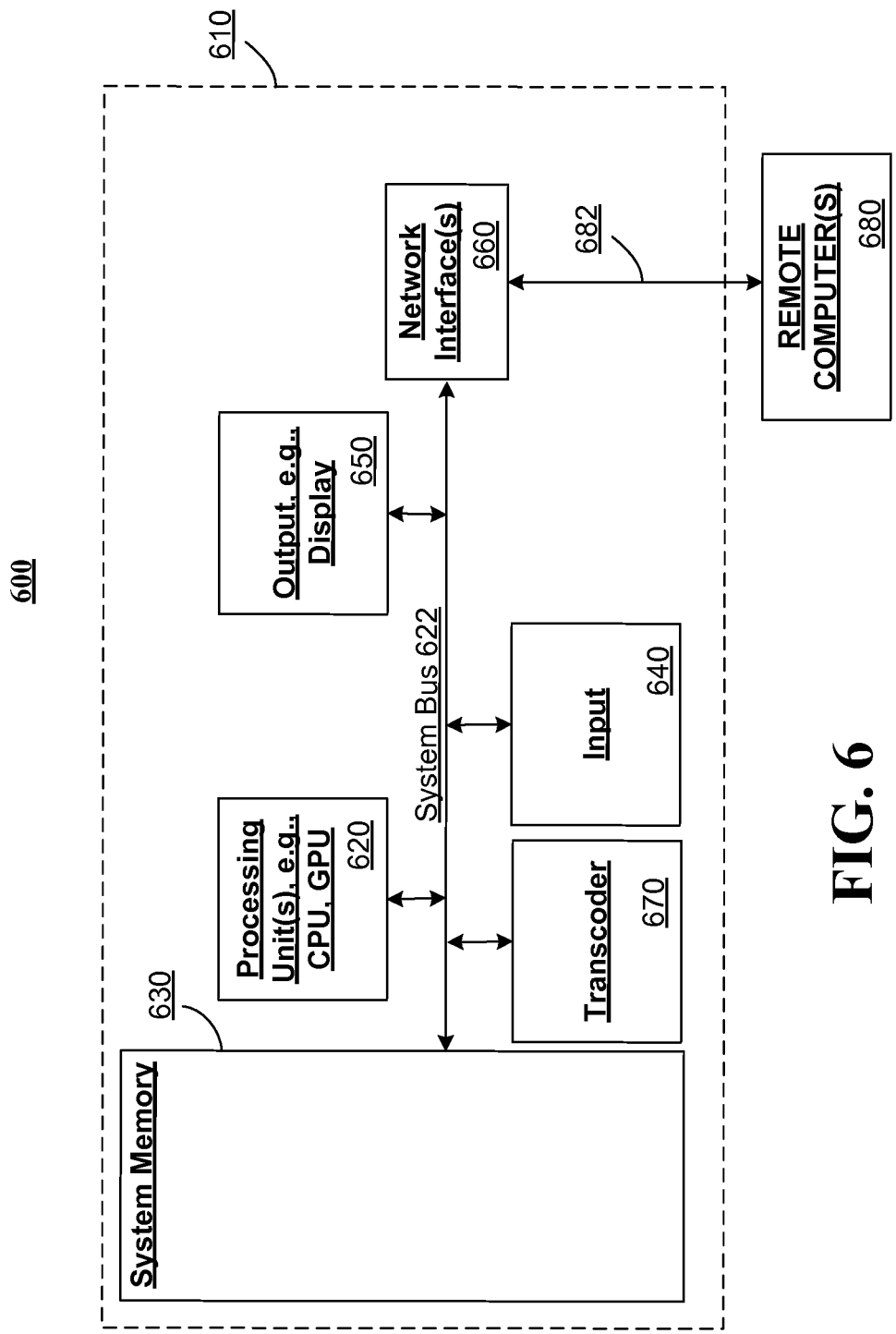
FIG. 6 is an illustration of a schematic diagram of an exemplary computing environment for implementing one or more implementations described in this disclosure.

As mentioned, advantageously, the techniques described in this disclosure can be applied to any suitable device. It is to be understood, therefore, that handheld, portable and other computing devices and computing objects of all kinds are contemplated for use in connection with the various implementations, i.e., anywhere that a device may wish to read or write transactions from or to a data store. Accordingly, the below remote computer described below in FIG. 6 is but one example of a computing device. Additionally, a suitable server can include one or more aspects of the below computer, such as media server or other media management server components.

Although not required, implementations can be partly implemented via an operating system, for use by a developer of services for a device or object, and/or included within application software that operates to perform one or more functional aspects of the various implementations described in this disclosure. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 6 thus illustrates an example of a suitable computing system environment 600 in which one or aspects of the implementations described in this disclosure can be implemented, although as made clear above, the computing system environment 600 is only one example of a suitable computing environment and is not intended to suggest any limitation as to scope of use or functionality. Neither is the computing environment 600 to be interpreted as having any dependency or requirement relating to any one or combination of components illustrated in the exemplary computing environment 600.

With reference to FIG. 6, an exemplary computing environment 600 for implementing one or more implementations includes a computing device in the form of a computer 610 is provided. Components of computer 610 can include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 can include computer storage media in the form of volatile and/or nonvolatile memory such as read only memory (ROM) and/or random access memory (RAM). By way of example, and not limitation, memory 630 can also include an operating system, application programs, other program modules, and program data.

Computer 610 can also include a transcoder 670. Transcoder 670 can perform encoding. In some implementations, the transcoder 670 can convert data encoded in a first format to data encoded in a second format. In various implementations, transcoder 670 can also perform decoding.

A user can enter commands and information into the computer 610 through input devices 640, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 610. A monitor or other type of display device can be also connected to the system bus 622 via an interface, such as output interface 650. In addition to a monitor, computers can also include other peripheral output devices such as speakers and a printer, which can be connected through output interface 650.

The computer 610 can operate in a networked or distributed environment using logical connections to one or more other remote computers, such as remote computer 680. The remote computer 680 can be a personal computer, a server, a router, a network PC, a peer device or other common network node, or any other remote media consumption or transmission device, and can include any or all of the elements described above relative to the computer 610. The logical connections depicted in FIG. 6 include a network 682, such local area network (LAN) or a wide area network (WAN), but can also include other networks/buses e.g., cellular networks.

As mentioned above, while exemplary implementations have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, implementations herein are contemplated from the standpoint of an API (or other software object), as well as from a software or hardware object that implements one or more aspects described in this disclosure. Thus, various implementations described in this disclosure can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the implementations described in this disclosure can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

When the implementations are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described in this disclosure can be implemented with modules or components (e.g., procedures, functions, and so on) that perform the functions described in this disclosure. The software codes can be stored in memory units and executed by processors. A memory unit can be implemented within the processor or external to the processor, in which case it can be communicatively coupled to the processor via various structures.

The word "exemplary" is used herein to mean serving as an example, instance, or illustration. For the avoidance of doubt, the subject matter disclosed herein is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more implementations. It is, of course, not possible to describe every conceivable combination of components or methodologies for purposes of describing the aforementioned implementations, but one of ordinary skill in the art can recognize that many further combinations and permutations of various implementations are possible. Accordingly, the described implementations are intended to embrace all such alterations, modifications and variations that fall within the spirit and scope of the appended claims. Moreover, use of the term "an implementation" or "one implementation" throughout is not intended to mean the same implementation unless specifically described as such. Further, use of the term "plurality" can mean two or more.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies described in this disclosure after.

In addition to the various implementations described in this disclosure, it is to be understood that other similar implementations can be used or modifications and additions can be made to the described implementation(s) for performing the same or equivalent function of the corresponding implementation(s) without deviating there from. Still further, multiple processing chips or multiple devices can share the performance of one or more functions described in this disclosure, and similarly, storage can be provided across a plurality of devices. The invention is not to be limited to any single implementation, but rather can be construed in breadth, spirit and scope in accordance with the appended claims.

What is claimed is:

1. A method, comprising:
    employing a microprocessor to execute computer executable components stored within a memory to perform the following:
    generating one or more wavelet-based hashes based, at least, on one or more wavelets associated with a portion of media;
    generating a weighted set of descriptors associated with the portion of media;
    computing one or more hashes from the one or more wavelet-based hashes;
    grouping at least one of the one or more wavelet-based hashes into one or more groups of wavelet-based hashes;
    combining the one or more groups of wavelet-based hashes with the weighted set of descriptors, wherein the one or more groups of wavelet-based hashes comprises a weighted set of the one or more groups of wavelet-based hashes; and
    generating a final hash based, at least, on hashing the combined one or more groups of the wavelet-based hashes with the weighted set of descriptors, wherein the weighted set of descriptors comprises at least one of: a weighted set of one or more local descriptors, a weighted set of one or more quantized local descriptors or a weighted set of visual words.

2. The method of claim 1, wherein the portion of media comprises at least one of a frame of media or an average of two or more frames of media.

3. The method of claim 1, wherein the combining the one or more groups of wavelet-based hashes with the weighted set of descriptors comprises concatenating the one or more groups of wavelet-based hashes with the weighted set of descriptors.

4. The method of claim 1, wherein the media is at least one of video or an image.

5. The method of claim 1, wherein the wavelet-based hashes are based on overcomplete wavelets.

6. A computer-readable storage medium storing executable instructions that, when executed on a processor, cause the processor to perform operations comprising:
    generating one or more wavelet-based hashes based, at least, on one or more wavelets associated with a portion of media;
    generating a weighted set of descriptors associated with the portion of media, wherein the weighted set of descriptors comprises at least one of: a weighted set of one or more local descriptors, a weighted set of one or more quantized local descriptors or a weighted set of visual words;
    computing one or more hashes from the one or more wavelet-based hashes;
    grouping at least one of the one or more wavelet-based hashes into one or more groups of wavelet-based hashes;
    combining the one or more groups of wavelet-based hashes with the weighted set of descriptors, wherein the one or more groups of wavelet-based hashes comprises a weighted set of the one or more groups of wavelet-based hashes; and
    generating a final hash based, at least, on hashing the combined one or more groups of the wavelet-based hashes with the weighted set of descriptors, wherein the wavelet-based hashes are based on overcomplete wavelets.

7. The computer-readable storage medium of claim 6, wherein the portion of media comprises at least one of a frame of media or an average of two or more frames of media.

8. The computer-readable storage medium of claim 6, wherein the media comprises at least one of a video or an image.

9. The computer-readable storage medium of claim 6, wherein combining the one or more groups of wavelet-based hashes with the weighted set of descriptors comprises concatenating the one or more groups of wavelet-based hashes with the weighted set of descriptors.

10. A method, comprising:
    employing a microprocessor to execute computer executable components stored within a memory to perform the following:
    generating a plurality of hashes based, at least, on a plurality of first descriptors associated with media;
    generating a plurality of local descriptors associated with the media;
    generating a combined group of descriptors, the combined group of descriptors including quantized ones of the plurality of local descriptors and groups of the plurality of hashes; and
    a hash generation component that generates a final hash based, at least, on a hash of the quantized ones of the plurality of local descriptors with the groups of the plurality of hashes, wherein the quantized ones of the plurality of local descriptors are hashed with the groups of the plurality of hashes using a weighted minhash function.

11. The method of claim 10, wherein the media is at least one of video or an image.

12. A computer-readable storage medium storing executable instructions that, when executed on a processor, cause the processor to perform operations comprising:
    generating a plurality of hashes based, at least, on a plurality of first descriptors associated with media;
    generating a plurality of second descriptors associated with the media;
    grouping the plurality of hashes into two or more subgroups;
    generating a combined group of descriptors, the combined group of descriptors including quantized ones of the plurality of second descriptors and groups of the plurality of hashes; and
    generating a final hash based, at least, on hashing the quantized ones of the plurality of second descriptors with the groups of the plurality of hashes, wherein the generating the final hash is performed using a weighted minhash function.

13. A computer-readable storage medium storing executable instructions that, when executed on a processor, cause the processor to perform operations comprising:
    fingerprinting a portion of media, wherein the fingerprinting is performed based on operations comprising:
    generating at least first information and second information associated with the portion of the media;
    computing a first set of one or more hashes from the first information;
    computing a second set of one or more hashes from the second information;
    combining the first set of the one or more hashes and the second set of the one or more hashes; and
    generating a final hash based, at least, on hashing the combined first set of the one or more hashes with the second set of the one or more hashes, wherein the first information comprises at least one of one or more wavelet-based hashes associated with the portion of the media or one or more local descriptors associated with the portion of the media.

* * * * *